United States Patent [19]

Blucher

[11] 4,002,498
[45] Jan. 11, 1977

[54] ELECTROLYTE-DEPOLARIZERS FOR THERMAL BATTERIES

[75] Inventor: Richard L. Blucher, Baltimore, Md.

[73] Assignee: Catalyst Research Corporation, Baltimore, Md.

[22] Filed: Mar. 22, 1962

[21] Appl. No.: 182,714

[52] U.S. Cl. .................. 136/205; 136/236 R; 429/112 CR

[51] Int. Cl.² ............... H01V 1/30; H01M 10/00

[58] Field of Search ........... 136/90, 90.5, 137, 153, 136/4, 205, 201, 236 R, 6 L

[56] References Cited

UNITED STATES PATENTS

| | | | |
|---|---|---|---|
| 2,102,701 | 12/1937 | Gyuris | 136/83 |
| 2,528,891 | 11/1950 | Lawson | 136/137 |
| 2,692,215 | 10/1954 | Ruben | 136/137 |
| 2,981,779 | 4/1961 | Freund | 136/90 |
| 2,999,122 | 9/1961 | Zauner | 136/90 |

Primary Examiner—Nelson Moskowitz
Attorney, Agent, or Firm—Brown, Murray, Flick & Peckham

EXEMPLARY CLAIM

5. A thermal deferred action cell comprising a first metal electrode shaped in receptacle form, a second electrode of a metal other than said first metal centrally disposed in said receptacle, unitary electrolyte-depolarizer wafers disposed on opposite sides and in contact with said second electrode, said wafers being a pressure compacted composition consisting essentially of an intimate finely divided mixture of a depolarizer, a fusible alkali metal salt electrolyte, and an inert absorbent, the absorbent being present in an amount sufficient to absorb the electrolyte when in a fluid condition.

8 Claims, No Drawings

ELECTROLYTE-DEPOLARIZERS FOR THERMAL BATTERIES

This invention relates to thermal batteries and in particular it comprises improved elements for use in such batteries.

Thermal type deferred action cells and batteries are characterized by being inactive at normal atmospheric temperatures, and become active only when heat is supplied. Such cells include at least one positive plate, at least one negative plate, an electrolyte that is solid and inactive at ordinary temperatures but which becomes functionally active when heat is supplied, depolarizers, electrolyte carriers and the like.

The electrolyte pad used in the cells commercialized heretofore of which I am aware have comprised a material such as fiberglass woven to mat form and which has been impregnated with an electrolyte such as a lithium bromide-potassium bromide salt mixture other than the eutectic. That eutectic melts at about 348° C; therefore a cell using a non-eutectic operates at temperatures where the electrolyte is largely a slush to avoid deleterious electrolyte migration under spin and acceleration conditions to which such cells are subjected. A fully liquid state could not be tolerated because of migration. Another possible electrolyte that could be used, at least on a theoretical basis, is the lithium chloride-potassium chloride eutectic which melts at about 364° C. In using such electrolytes by impregnating a fiberglass mat or the like, it is essential to raise the salt temperature higher than the temperature that will be used for cell operation. For some unexplainable reason, but possibly due to a reaction of the salts and the glass at the high temperatures, that practice results in reduced cell output. It is to the avoidance of such problems that the present invention is directed.

It is, therefore, a primary object of the present invention to provide novel thermal deferred action batteries characterized by an electrolyte that is completely fluid at cell operating temperatures but does not become inoperable under conditions of spin and acceleration.

It is a further object of the present invention to provide thermal deferred action cells and batteries of a simpler construction than has heretofore characterized useful and commercial batteries of this general nature.

These and other objects are attained in accordance with my invention in which all functional and structural components, other than the electrodes, of the thermal deferred action battery are in a single unit or layer. This is accomplished in my invention with the use of a salt mixture as an electrolyte, such as the lithium chloride-potassium chloride eutectic, in conjunction with inert absorbent materials such, for example, as bentonite, kaolin, and magnesium oxide, and a suitable depolarizer such as calcium chromate, $CaCrO_4$. In this general manner, I have been able to provide cells that have increased capabilities under acceleration and improved performance under spin. This development eliminates separate electrolyte carriers and depolarizer pads and sharply reduces the weight and volume of the resulting cells, considering standardized electrical performances. Moreover, the elimination of several of the parts that were heretofore characteristic of these general type cells has minimized and reduced the assembly procedure in that, for example, the number of spot welds is reduced, the processing variables are minimized and, thus, reduced component inspection is possible and the fewer parts contribute to standardization. Of course, with fewer parts and easier assembly, human errors are minimized and less capital equipment is required. Functionally improved cells result that start faster due to the fact that the depolarizer and the electrolyte are already mixed, and less heat is required for the smaller weight and volume mean that less mass is present to be heated. Moreover, for a given electrolyte, cell operating temperatures are lowered in consequence of these discoveries.

From the foregoing statement of invention, it will be evident that a large number of electrolytes and depolarizers are available that can be used in the invention. Typical electrolytes are the eutectics of lithium chloride-potassium chloride and lithium bromide-potassium bromide, as well as the eutectic of lithium hydroxide-lithium chloride (m.p. 290° C) and other alkali metal salt eutectics. Suitable depolarizers include potassium dichromate, potassium chromate, molybdic oxide ($MoO_3$), tungstic oxide ($WO_3$), and calcium chromate ($CaCrO_4$).

The limiting amounts to materials to be used in any given cell is, of course, largely dependent upon the materials used and the electrical results to be achieved. In any event, an amount of electrolyte is used, relative to the absorbent, that can be fully absorbed by the absorbent when the electrolyte is fluid. Generally, the depolarizer is present within the range of about 30 to 70 weight percent, the electrolyte eutectic in an amount of 20 to 45 percent, and the absorbent in the range of 5 to 30 weight percent, with the total of the three major components being essentially 100 percent. While the generic characteristic of the invention is evident, further description will be related to specific materials.

The single wafer of the invention can be made, in weight percent, from the following: 33.3 to 70.0 percent of calcium chromate, 12.5 to 22.6 percent of potassium chloride, 11.3 to 20.6 percent of lithium chloride and 5.0 to 25.5 percent of the inert absorbent, such as kaolin. The actual amount of each component within the foregoing range can be varied depending on the electrical requirements for the given application contemplated as, for example, the spin and acceleration requirements that the resulting cell must resist. These materials as used should be protected from moisture so that undue hydration does not detract from cell performance. Particularly satisfactory procedures for preparing these materials in excellent condition for use in cells in this invention are as follows: The potassium chloride can be placed in an inert pan made of Pyrex or porcelain and heated at 215° to 285° F in a vacuum, for example on the order of 2000 microns (mercury) or less for an extended period of say 4 to 25 hours. The lithium chloride can be prepared under the same conditions of temperature and pressure as above but for the longer period of about 16 to 48 hours. The inert absorbent, for example kaolin, after washing can be baked in a container such as a nickel pan in a ventilated furnace at a temperature of about 1050° to 1,100° F for about 5 hours. The calcium chromate or other depolarizer can be subjected to conditions of temperature and pressure similar to those used in stabilizing the potassium and lithium chlorides for not more than about 5 hours. All of the foregoing materials are then stored in sealed glass containers until use, and are then preferably used in controlled areas having a maximum relative humidity of not more than about 5 percent.

In forming a wafer from these compositions, the materials are mixed and then compressed. The compressed material then can be ground to the desired size. Then the configuration of the wafer, such as its shape and thickness, is produced by using a die of suitable dimensions and pressing a wafer therefrom.

In making cells with wafers of this invention, an electrode pair such as nickel and calcium is provided, though it is apparent to the artisan that any other pair of metals could also be used. In one suitable practice, a receptacle electrode is formed of nickel and one of its surfaces is coated with the second metal calcium. A shape of nickel is then used to serve as the central electrode. The receptacle electrode is shaped to U-form, as viewed from the side, and the cell is assembled by first placing one of the electrolyte-depolarizer-absorbent wafers in the case, placing the central electrode on top of that, then placing another wafer on the central electrode and closing the covering electrode. Of course, provision is made for an electrical lead to the central electrode. The shape of cells as well as the assemblies thereof to form batteries can be widely varied. However, a cupshaped cell made of generally circular elements is preferred.

The invention will be described further in conjunction with the following specific example in which the details are given by way of illustration and not by way of limitation.

A batch of the 4 components is prepared by mixing in a 25 pound stone jar with 150 porcelain pebbles at a speed of 60 rpm. for 45 minutes, 46 weight percent of calcium chromate, 33 weight percent of the potassium chloride-lithium chloride eutectic and the remainder (21 weight percent) kaolin. Each of the components is first stabilized, to minimize the moisture content and drive off volatiles in the manner specified above. The mixed powders are then compressed in a slug press at 60,000 psi nominal pressure to a density of about 2.22 gm/cm$^3$. The resulting slugs are then granulated and the granulate is sieved. The material that passes a No. 40 U.S. Standard Sieve and can be retained on a No. 270 U.S. Standard Sieve is recovered. The recovered granulate is then placed in a die cavity having a depth of 0.048 inch and compressed at a pressure of about 28 tons/sq. inch.

Wafers made in accordance with the foregoing practice are then assembled with nickel and calcium electrodes to form a cell. The nickel serves as an enveloping electrode and the calcium is used on its inside surface. Nickel is used as the central electrode. Cells having an opposed electrode area of 0.389 square inch were then tested. Five cells made in this manner were tested under the same conditions as five cells made in accordance with the prior practices, but having the same electrode area, in which separate depolarizers and electrolyte pads were used. The electrolyte of the prior cells was the lithium bromide-potassium bromide eutectic. The cells were heated to a temperature of 508° C subjected to 140 lbs/sq. inch of pressure and had a load of 34.9 ohms. The data obtained including the open contact voltage are set forth in the following table:

TABLE I

CELL PERFORMANCE VOLTAGE

| Cell No. | 1 | 2 | 3 | 4 | 5 | 6 | 7 | 8 | 9 | 10 |
|---|---|---|---|---|---|---|---|---|---|---|
| Peak Voltage(O.C.) | 3.0 | 2.9 | 2.9 | 2.9 | 2.95 | 2.8 | 3.0 | 3.0 | 3.0 | 2.95 |
| 0 sec. | 2.5 | | 2.5 | 2.5 | 2.5 | 2.6 | 2.6 | 2.63 | 2.63 | 2.63 |
| 10 sec. | 2.4 | 2.4 | 2.4 | 2.4 | 2.4 | 2.6 | 2.6 | 2.63 | 2.63 | 2.6 |
| 20 sec. | 2.4 | 2.4 | 2.4 | 2.4 | 2.4 | 2.6 | 2.6 | 2.63 | 2.63 | 2.63 |
| 30 sec. | 2.3 | 2.3 | 2.3 | 2.4 | 2.4 | 2.6 | 2.6 | 2.6 | 2.6 | 2.6 |
| 40 sec. | 2.2 | 2.2 | 2.2 | 2.3 | 2.3 | 2.55 | 2.58 | 2.6 | 2.6 | 2.58 |
| 50 sec. | 2.1 | 2.0 | 2.0 | 2.2 | 2.3 | 2.55 | 2.58 | 2.6 | 2.6 | 2.58 |
| 60 sec. | 2.0 | 2.0 | 2.0 | 2.10 | 2.2 | 2.5 | 2.55 | 2.6 | 2.6 | 2.55 |
| 90 sec. | 1.7 | 1.7 | 1.7 | 1.7 | 2.0 | 2.5 | 2.5 | 2.58 | 2.55 | 2.50 |
| 120 sec. | 1.6 | 1.6 | 1.6 | 1.6 | 1.7 | 2.5 | 2.4 | 2.55 | 2.50 | 2.50 |
| 150 sec. (O.C.) | | 2.2 | 2.2 | 1.9 | 2.2 | 2.5 | 2.4 | 2.45 | 2.50 | 2.40 |
| 180 sec. | | | | | | 2.4 | 2.4 | 2.4 | 2.4 | 2.4 |
| 3½ min. | | | | | | 2.4 | 2.4 | 2.2 | 2.3 | 2.35 |
| 4 min. | | | | | | 2.3 | 2.3 | 2.2 | 2.2 | 2.3 |
| 4½ min. | | | | | | 2.25 | 2.25 | 2.25 | 2.2 | 2.2 |
| 5 min. | | | | | | 2.2 | 2.2 | 2.2 | 2.15 | 2.2 |
| 5½ min. | | | | | | 2.1 | 2.1 | 2.15 | 2.1 | 2.15 |
| 6 min. | | | | | | 2.00 | 2.00 | 2.10 | 2.00 | 2.10 |
| 6½ min. | | | | | | 1.90 | 1.90 | 2.00 | 1.90 | 2.00 |
| 7 min. | | | | | | 1.80 | 1.80 | 1.90 | 1.80 | 1.90 |
| 7½ min. | | | | | | 1.60 | 1.60 | 1.60 | 1.60 | 1.70 |
| O.C. Voltage | | | | | | 2.2 | 2.3 | 2.2 | 2.3 | 2.3 |

From the above data and discussion, it is evident that not only are the physical and manufacturing advantages heretofore mentioned achieved, but the electrical characteristics have been sharply improved. The peak voltages with cells of this invention (cells 6 to 10) were maintained over a longer period of time and sharply higher voltages were maintained over this extended period. These results in conjunction with the improved resistance to spin and acceleration indicate that this is a marked improvement in cells that can provide power especially for certain military operation conditions.

In accordance with the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A unitary electrolyte-depolarizer wafer for thermal deferred action cells, the wafer being a pressure compacted composition consisting essentially of an intimate finely divided mixture of a depolarizer, a fusible alkali metal salt electrolyte, and a finely divided inert absorbent, said absorbent being present in an amount sufficient to absorb said electrolyte when in a fluid condition.

2. An electrolyte-depolarizer wafer in accordance with claim 1 in which said depolarizer is present in an amount of about 30 to 70 weight percent, the electrolyte is present in an amount of about 20 to 45 weight percent and the absorbent is present in an amount of about 5 to 30 weight percent.

3. An electrolyte-depolarizer wafer in accordance with claim 1 in which said depolarizer is calcium chromate and is present in an amount of 33.3 to 70.0 weight percent, said electrolyte is the eutectic of potassium chloride and lithium chloride and is present in an amount of 23.8 to 43.2 weight percent and said inert absorbent is present in the amount of 5.0 to 25.5 percent.

4. An electrolyte-depolarizer wafer in accordance with claim 3 in which said inert absorbent is selected from the group consisting of kaolin, bentonite, and magnesium oxide.

5. A thermal deferred action cell comprising a first metal electrode shaped in receptacle form, a second electrode of a metal other than said first metal centrally disposed in said receptacle, unitary electrolyte-depolarizer wafers disposed on opposite sides and in contact with said second electrode, said wafers being a pressure compacted composition consisting essentially of an intimate finely divided mixture of a depolarizer, a fusible alkali metal salt electrolyte, and an inert absorbent, the absorbent being present in an amount sufficient to absorb the electrolyte when in a fluid condition.

6. A cell in accordance with claim 5 in which the electrolyte-depolarizer wafers have a composition consisting essentially of about 30 to 70 weight percent of the depolarizer, about 20 to 45 weight percent of the electrolyte, and the absorbent is present in an amount of about 5 to 30 weight percent.

7. A cell in accordance with claim 5 in which the electrolyte-depolarizer wafers have a composition consisting essentially of 33.3 to 70.0 weight percent of calcium chromate, said electrolyte is the eutectic of potassium chloride and lithium chloride and is present in an amount of 23.8 to 43.2 weight percent and said inert absorbent is present in the amount of 5.0 to 25.5 percent.

8. A cell in accordance with claim 7 in which the absorbent in the electrolyte-depolarizer wafers is selected from the group consisting of kaolin, bentonite, and magnesium oxide.

* * * * *